Jan. 26, 1937. T. S. PENDERGAST ET AL 2,068,697
REFRIGERATING APPARATUS
Filed Nov. 30, 1931  2 Sheets-Sheet 1
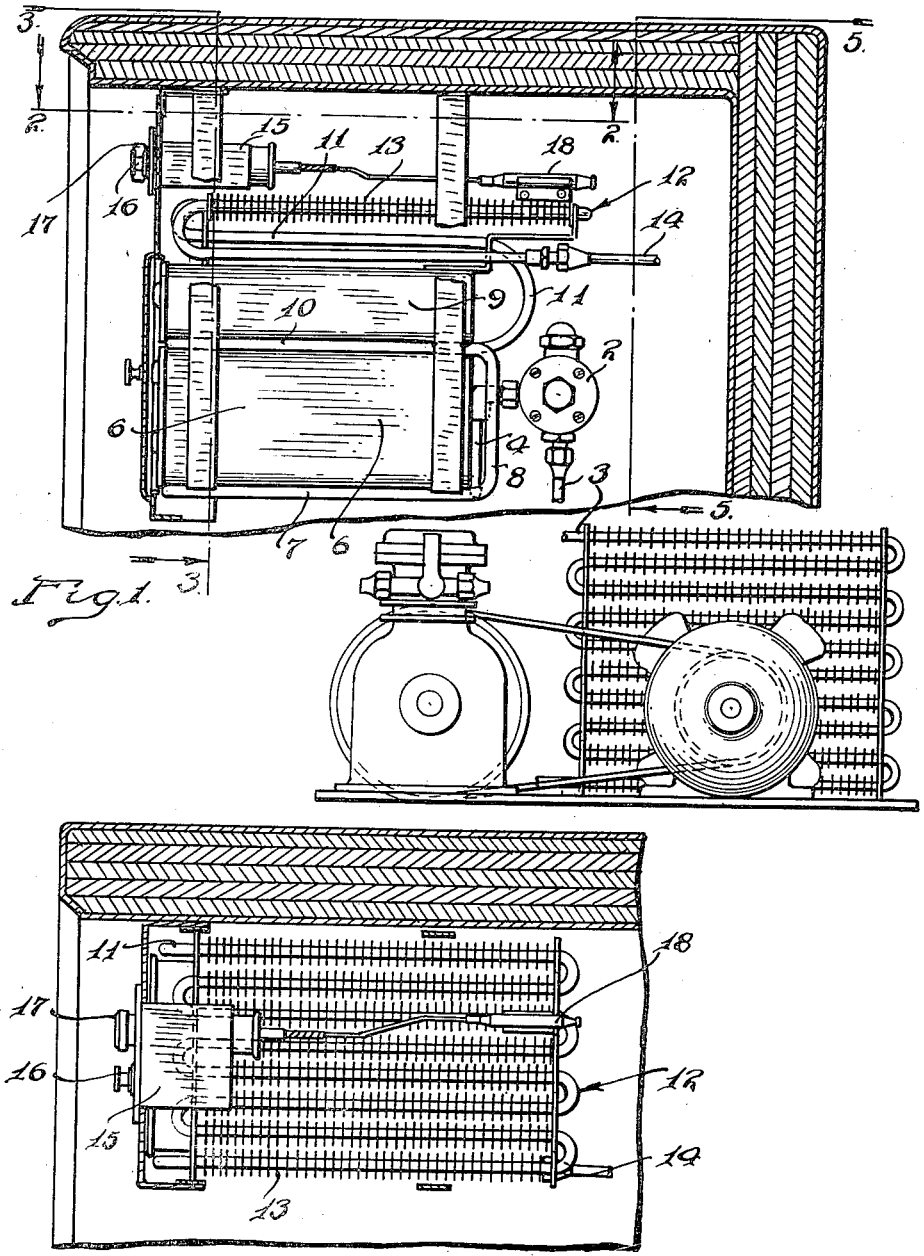
INVENTORS.
THOMAS S. PENDERGAST.
BY RALPH BAUM.
Barnes & Kisselly
ATTORNEYS Jan. 26, 1937. T. S. PENDERGAST ET AL 2,068,697
REFRIGERATING APPARATUS
Filed Nov. 30, 1931 2 Sheets-Sheet 2

INVENTOR
THOMAS S. PENDERGAST
BY RALPH BAUM.
Barnes & Kisselle
ATTORNEYS

Patented Jan. 26, 1937

2,068,697

UNITED STATES PATENT OFFICE 2,068,697

REFRIGERATING APPARATUS

Thomas S. Pendergast and Ralph Baum, Detroit, Mich., assignors to Universal Cooler Corporation, Detroit, Mich., a corporation of Michigan Application November 30, 1931, Serial No. 578,049

2 Claims. (Cl. 62—8)

This invention relates to refrigerating apparatus and has to do with substantially independent means for defining a sharp freezing chamber and for controlling the temperature of the box, but supplied with the same source of refrigerant.

The placing of sharp freezing coils and box cooling coils in series has heretofore been attempted in several different ways, the most common of which being the placing of the sharp freezing coils in a compartment completely isolated from the food chamber. In the few instances we are aware of where the sharp freezing and box coils have been placed in the same compartment some positive means has usually been provided for thermally insulating the two sets of coils from each other.

One of the objects of the present invention is the provision of a simple, compact evaporating unit which may be located as a unit adjacent the upper part of the food chamber, and containing box cooling and sharp freezing coils in series, the sharp freezing coils being so positioned and arranged as to have very little effect upon the cooling of the air in the box and the box cooling coils being so positioned and of such great surface area that refrigeration of the food chamber is obtained with very little, if any, frosting effect.

Some other features of the invention reside in the positioning of the air cooling coils above the sharp freezing coils in such a manner as to obtain the greatest possible wiping effect between the air and the coils, and the arrangement of the sharp freezing coils in horizontal position and beneath the sharp freezing chamber or chambers to reduce the refrigerating effect of such coils on the air in the box to a minimum.

The air cooling coils are not only of such great surface area as to efficiently cool the air in the box without material frosting of any portion thereof but the thermostat control is preferably positioned adjacent the air cooling coils for controlling operation of the refrigerating system, and for working in combination with a series hook-up of the system to provide for automatic operation; the direct result of this arrangement and control is that substantially all the moisture remains in the air within the box thus providing an ideal storage compartment, and a temperature control in the system dependent upon the amount of work done in the air cooling coils.

Other novel characteristics and features of the structure and system will be brought out in the specification and claims.

In the drawings:

Fig. 1 is a sectional view taken on line 1—1 of Fig. 4 and showing the complete unit in side elevation.

Fig. 2 is a plan view of our evaporating unit taken on line 2—2 of Fig. 1 and showing in particular the manner of positioning the temperature control coil relative to any part of the air cooling coil and the manner of connecting the same to the control unit of the system.

It is possible to cool the food compartment of a domestic refrigerator with a relatively small evaporator, providing it is possible to run the system cold enough, but if the evaporator runs cold enough to obtain efficient cooling of the food compartment, it is obvious that the moisture in the air will condense upon the surface of the cooling unit and develop a layer of frost of such thickness as to materially lower the efficiency of the system. It is possible with our combined evaporator to provide a sharp freezing chamber or chambers for freezing ice cubes and the like and at the same time provide a separate portion of the evaporator for cooling the air in the food compartment without materially frosting and without material dehydration of the air within the compartment.

Taking up each element of the evaporating unit in its order, an expansion valve 2 controls the inlet of refrigerant from the condenser coil 3 into the evaporator coil 4. This evaporator coil is continuous and the form and arrangement of this continuous coil plays an important part in the present invention.

Figure 3:
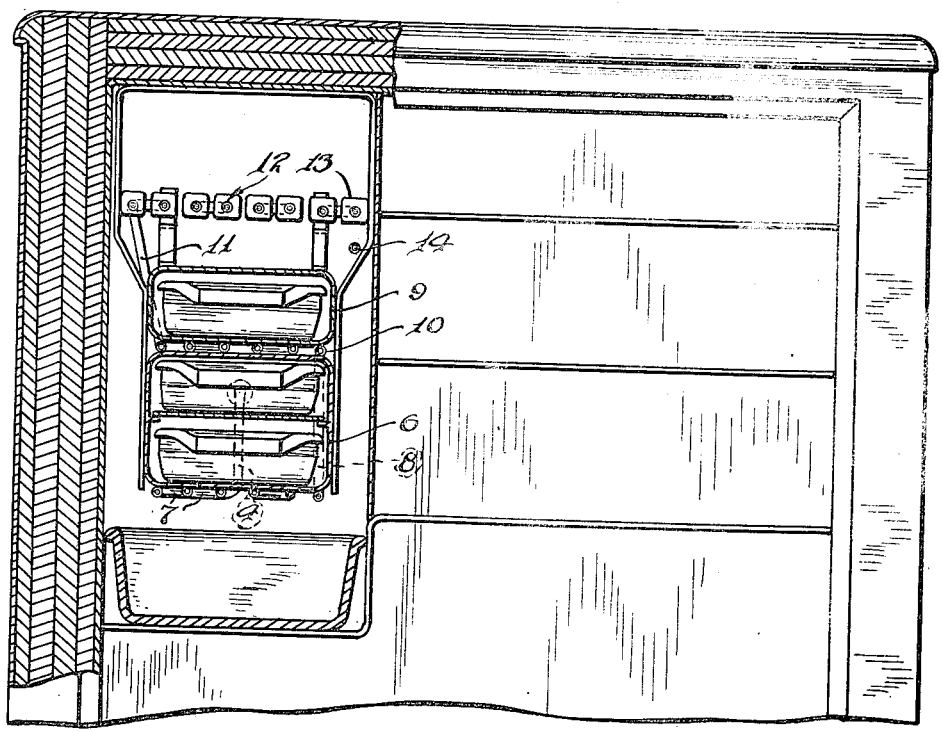
Fig. 3 is a front elevation, partly in section, of our novel unit shown as installed in a standard domestic refrigerator.
Figure 4:
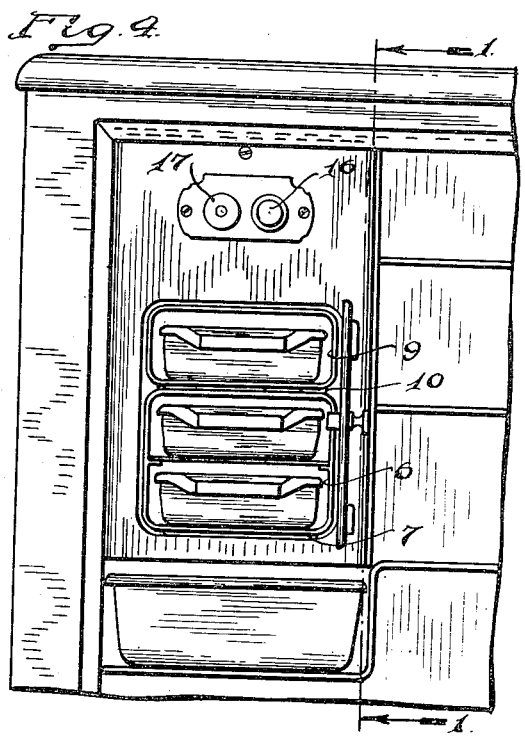
Fig. 4 is a fragmentary front elevation, similar to Fig. 3, but showing the front panel for the evaporating unit in position and the door for the sharp freezing chambers in open position.
Figure 5:
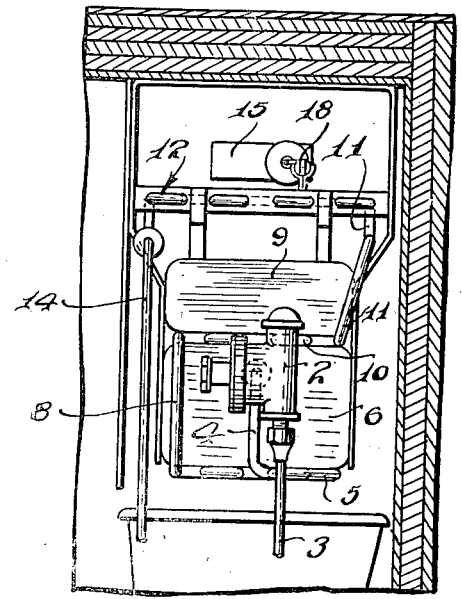
Fig. 5 is a rear elevation of the complete unit.

As best shown in Fig. 5, the coil 4 extends downwardly and then outwardly as at 5 to the edge of the sharp freezing compartment 6. This compartment 6 is merely an enclosure for preventing the drip into the ice pans and while the side walls thereof are vertical, they have very little refrigerating effect upon the surrounding air. From the outward extension 5 the coil extends longitudinally back and forth along the bottom of the sleeve 6 as at 7 to form a series of longitudinal convolutions terminating in a coil 8 (see Figs. 1 and 5) which lead to the bottom of a compartment or sleeve 9 which is preferably spaced a short distance above the sleeve 6 and the upward extension 8 of the coil is bent so as to extend between the spaced sleeves 6 and 9 and form a series of horizontal convolutions 10 similar to the convolutions 7 at the bottom of the sleeve 6. It will thus be seen that the sharp freezing coils 7 and 10 are positioned almost entirely at the bottoms of the sharp freezing compartments and thus have very little effect upon the surrounding air in the food compartment.

The coil 10 is now connected by means of an extension 11 into the front end of the air cooling coil which may be generally designated 12. This air cooling coil 12 is preferably in a series of longitudinal convolutions somewhat similar to the coils 7 and 10 except that in most cases they are preferably longer and provided with fins 13 to greatly increase the effective surface area thereof. The length of the effective sharp freezing coils 7 and 10 and the length and surface area of the air cooling coils 12 will vary in accordance with the sharp freezing capacity and in accordance with the capacity of the food chamber or chambers. In other words, the size of the box may vary without changing the capacity of the sharp freezing chambers in which case the surface area of the coils 12 will be increased, or vice versa, if any increase in sharp freezing capacity is desired. In all events, the effective surface area of the air cooling coils 12 is very much greater than the effective surface area of the sharp freezing portion of the unit; in fact the effective surface area of the air cooling coil is so great relative to the cubic foot capacity of the box that we have one set of sharp freezing coils and one set of air cooling coils for cooling the air at a relatively high temperature without dehydration or drying. In other words, the effective surface area of the coil 12 is so great that heat transfer takes place between the coils and surrounding air at so great a volume as to make it possible to maintain the air cooling coils at a temperature high enough to prevent frosting but low enough to keep the box at the required temperature.

The refrigerant returns from the air cooling coils to the compressor through the return conduit 14. The control of the entire refrigerating system is by means of the unit 15 which may contain a switch 16 for manual starting and stopping and a temperature control switch 17 for controlling the rate of freezing. A thermostatic control bulb 18 may be adjustably positioned at any point between the entrance 11 of the air cooling coil and the return conduit 15. This bulb is connected to the control unit 15 so as to directly control the starting and stopping of the entire system. By placing the thermostatic unit at some point on the air cooling coils, sufficient refrigerating effect of such air cooling coils is made positive. The compressor will run as long as it is needed and obviously will not stop because of any pressure condition in either of the two sets of coils. The refrigerant flows up through the sharp freezing coils, performs its work and then flows on up into the air cooling coils, dependent upon the amount of work to be done by such air cooling coils. We are thus assured of sufficient sharp freezing effect at all times and by locating the temperature control at some point in the length of the air cooling coils the system is controlled so that we are sure the compressor runs sufficient time to accomplish cooling and maintenance of the box at the proper temperature.

For multiple systems a thermostatically controlled expansion valve of the standard type may be used and the bulb therefor located adjacent the cooling coil in the same manner as above described with reference to the attaching of the bulb 18. It is important that the freezing coils are located on the bottom of the sharp freezing chambers so that very little heat exchange takes place between such coils and the air in the box, and it is just as important that the air cooling surface of the coil 12 be so greatly increased that refrigerating effect is obtained with very little frosting up of the unit. Due to the arrangement of the sharp freezing and air cooling coils in series and as one unit, and the locating of the control on the air cooling coils, the temperature of the box is the only means for starting the system but the running period is automatic regardless of whether the increased need for heat exchange is in the sharp freezing unit or in the box proper, or both.

What we claim is:

1. A combined sharp freezing and air cooling evaporator for domestic refrigerators, comprising a continuous coil for conducting the refrigerant from and back to the refrigerating unit, the portion of said coil closest the condenser of the refrigerating system being arranged in close heat exchange relation with a wall of the sharp freezing compartment, a continuation of said coil being formed into an air cooling unit of relatively great surface area compared to the sharp freezing portion of the coil, said air cooling unit being positioned above the sharp freezing compartment and being open to free circulation of air therethrough, and means positioned adjacent the air cooling unit for controlling the flow of refrigerant, said means being adapted for adjustable mounting at various points on said air cooling unit to regulate the temperature at which the sharp freezing and air cooling coils are maintained.

2. A combined sharp freezing and air cooling evaporator for domestic refrigerators, comprising a shell defining a sharp freezing chamber, a refrigerant conducting coil positioned along the bottom surface of said shell, the sides of the shell being left free, said coil continuing from a position below the shell to a point above the shell, said coil at its position above the shell being provided with means for greatly increasing the effective heat exchange surface area thereof, said coil being formed in a series of convolutions, and a temperature control unit adjustably positioned at different points of said length of coil having a relatively great surface area, to control the flow of refrigerant by the temperature existing at the point of application of said temperature control unit.

THOMAS S. PENDERGAST.
RALPH BAUM.